July 17, 1962

E. HOLROYD ETAL 3,044,727

APPARATUS FOR SUPPLYING SHEET MATERIAL
TO A TIRE BUILDING MACHINE

Filed April 28, 1959

INVENTORS
Eric Holroyd
Felix Walter Waldron
by Benj. T. Rauber
their attorney

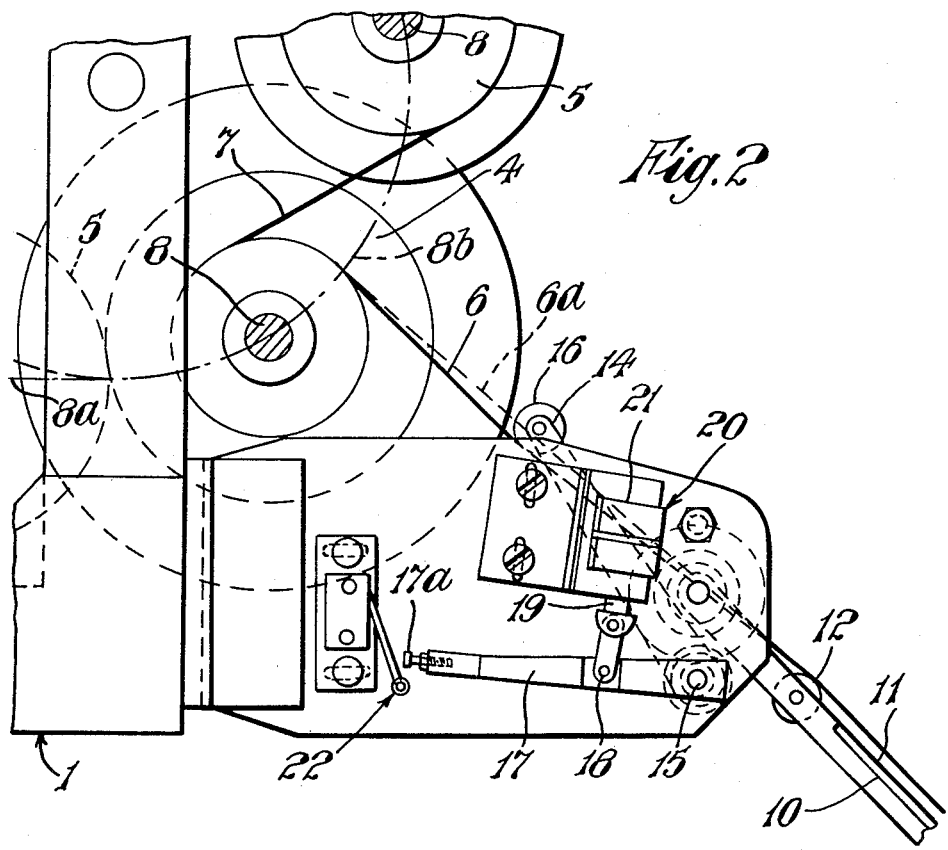

United States Patent Office 3,044,727
Patented July 17, 1962

3,044,727
APPARATUS FOR SUPPLYING SHEET MATERIAL TO A TIRE BUILDING MACHINE
Eric Holroyd, Sutton Coldfield, and Felix Walter Waldron, Streetly, England, assignors to Dunlop Rubber Company Limited, London, England, a British company
Filed Apr. 28, 1959, Ser. No. 809,509
Claims priority, application Great Britain May 7, 1958
4 Claims. (Cl. 242—67.3)

This invention relates to apparatus for supplying sheet tire-building material to a tire building machine.

Apparatus for supplying sheet tire-building material to a tire building machine is known which comprises rolls of bias-cut rubberised ply fabric interleaved with lining material supported on a frame-work, each roll of fabric having an associated spool for taking up the lining material as the ply fabric is unrolled. In use, the operator draws the ply from the appropriate roll by pulling upon the ply to draw its leading edge into position on the surface of an adjacent tire building former. The leading edge of the ply fabric is adhered to the former surface and the former rotated for a complete revolution to draw the ply fabric from the roll and wrap it around the entire circumference of the former. The ply fabric is then torn in a position to make a lap joint at the ends of the ply on the former and the surplus fabric is drawn back onto the roller for further use by rotating the fabric roll.

When bias-cut ply fabric is drawn by the operator onto the former, and also when the fabric is drawn by the former itself, from the roll, undesirable stretching and distortion of the fabric takes place and this results in a tire construction which does not conform to the requirements of the tire designer and which will not, therefore, give the desired performance.

It is an object of the present invention to provide apparatus for supplying sheet material which will considerably reduce the undesirable stretching and distortion which takes place when the apparatus referred to above is used.

According to the invention apparatus for supplying sheet tire building material to a tire building machine comprises a roll for carrying the sheet material, an electric driving motor for rotating the roll, a movable member for engagement with a length of the sheet material to cause deflection of the sheet material between the roll and the tire building machine, said member being movable upon straightening and deflection of the length of material, and electrical means for controlling the speed of rotation of the motor and actuated by the member so that the greater the degree of movement of the member upon straightening of the deflected length of material, the greater the speed of rotation of the motor.

In a preferred embodiment of the invention the movable member comprises a bell crank lever pivoted at the junction of its arms, one arm carrying at its free end a roller for engagement with the material from the roll and the other arm being connected to the electrical speed controlling means. In the preferred embodiment this means comprises a transducer connected to apparatus for varying the field current of a D.C. driving motor.

The roll for carrying the sheet material is preferably indirectly driven by means of a driven friction roller engaging the outer peripheral surface of lining material wound on an associated take-up roll. The lining material is interleaved, on the first-mentioned roll with the sheet material and thus when the lining material is unwound, the sheet material is simultaneously unwound. Alternatively, the drive may be coupled directly to the axle of the take-up roll or to the axle of the roll for carrying the sheet material.

One embodiment of the invention will now be described, by way of example, with reference to the accompanying drawings in which:

FIGURE 2 is an enlargement of a portion of FIGURE 1.

Figure 1:
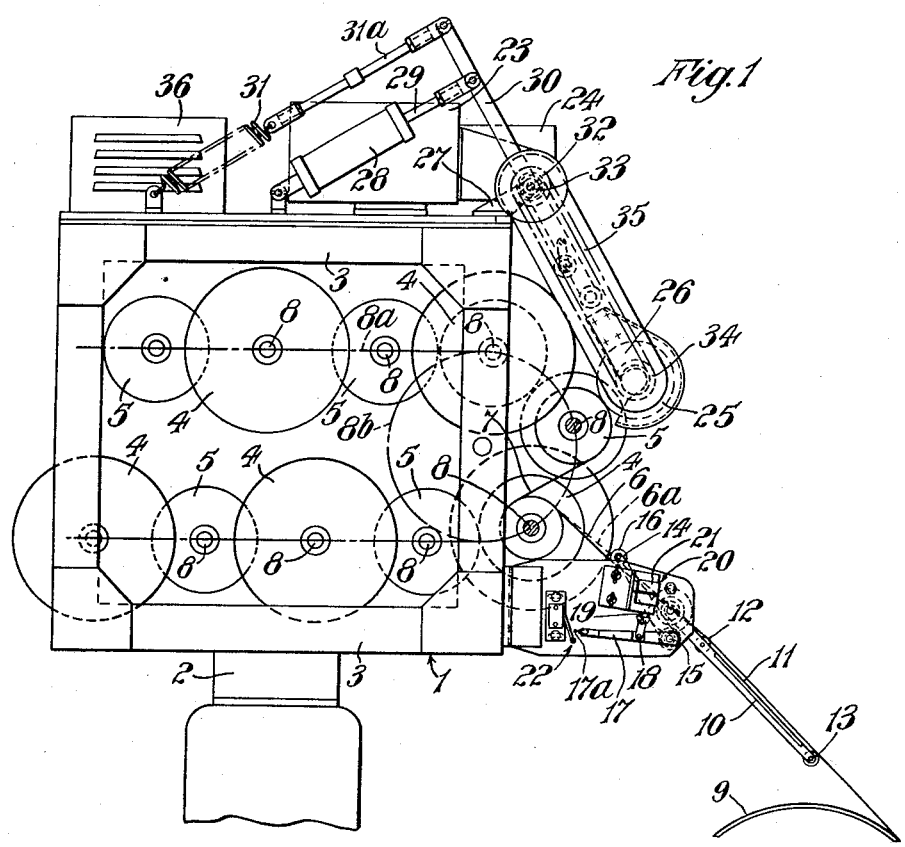
FIGURE 1 is a partly cross-sectional side elevation of part of a tire building material supply turret and part of a tire building former.

A turret 1 mounted on a vertical axis 2, carries within a supporting framework 3 a plurality of pairs of rolls 4 and 5. The rolls 4 carry a continuous length of rubberised ply fabric 6 interleaved with a lining material 7 which serves to separate adjacent faces of rubberised fabric. The roll 5 of each pair is utilised to take up the lining material 7 as the ply fabric 6 is unwrapped from the roll 4. The rolls 4 and 5 are mounted on axles 8 supported at their ends by a pair of horizontally disposed endless chains 8a, passing over sprockets 8b at each end of the turret frame. The sprockets are rotatable by a motor (not illustrated), step-by-step, into a series of positions to bring any pair of rolls into a convenient operating position adjacent to the tire-building former 9.

A guide tray 10 is located between the turret 1 and the tire-building former 9 and has a guide surface 11. The guide tray is provided at its ends with freely rotatable rollers 12 and 13.

A pair of spaced-apart levers 14 are mounted between the ply guide tray 10 and the turret, the levers being freely rotatably mounted on a common axis 15 which passes through the levers at one end thereof. The other end of each of the levers supports a roller 16 (hereinafter called a dancing roller) so that, in its normal position, a length of ply material 6 passing between any one of the rolls 4 on the turret carrying ply material and the roller 12, is deflected by the dancing roller 16 from the position 6a (shown dotted) of the ply 6 in which it forms a common tangent between the said roll 4 and ply guide tray roller 12.

The lever 14 shown in the drawing has an additional arm 17, this lever thus being a bell crank lever. The additional arm 17 is provided with an adjustable head 17a in the form of a screw in engagement with a screw-threaded hole in the arm. The arm is pivotally connected at a point 18 along its length to the movable core 19 of a transducer 20. The core of the transducer is located in its axially outermost position with respect to the transducer coil 21 when the length 6 of ply material is fully deflected and the arm 17, when in this position, also contacts a micro-switch 22 so as to close a circuit for the purpose to be later described.

A D.C. electric driving motor 23 is mounted on the turret frame 3 and is mechanically connected to a reduction gear-box 24. A rubber-surfaced driving roller 25 is rotatably mounted between the ends of a pair of arms 26 which are pivotable at their other ends on brackets 27 attached to the turret frame. A sprocket 32 is mounted on the output shaft 33 of the reduction gear box 24 and is inter-connected with a sprocket 34 at an end of the driving roller 25 by means of a chain 35, the electric motor 23 thus driving the roller 25 through the gear-box 24, sprockets 32 and 34 and chain 35.

The driving roller 25 is movable into and out of driving contact with any one of the rolls 5, the rubber surface of the roller 25 serving to prevent or limit slip when the roller 25 drives the roll 5. An air cylinder 28 is also located on the turret frame 3 and its connecting rod 29 is operatively connected adjacent to an end of a lever 30 pivotally mounted between its ends on the bracket 27, the other end of the lever 30 being connected to one of the arms 26 so that operation of the air cylinder 28 moves the driving roller into driving contact with one or other of the rolls 5. When the pressure is released from the cylinder 28, a return spring 31 attached at one end to the frame 3 and connected via a linkage 31a to the lever 30 moves the driving roller 25 away from the roll 5.

A speed-control unit 36, of known design employing thyratrons to control the field current of the motor 23, is mounted on the turret frame 3 and is connected to the electric motor 23 and to the transducer 20 in a manner so that when the core 19 of the transducer 20 is moved into the transducer coil 21, the speed of rotation of the motor 23 is increased. The micro-switch 22 earlier referred to operates an electrical circuit to place a load resistance across the armature of the motor 23 to provide dynamic braking therefor in a manner well known.

The apparatus just described operates in the following manner.

The required roll 4 of ply material 6 is brought into position adjacent to the former 9. The dancing roller 16 is then lifted by the operator so that the micro-switch 22 is disengaged to disconnect the dynamic braking circuit and so that the core 19 of the transducer 30 is moved into the transducer coil 21 to operate the speed control unit 36 and cause the electric motor 23 to rotate the lining take-up roll 5 and thus feed out a length of the ply material 6 from the ply-carrying roll 4. This ply material is then passed by the operator underneath the dancing roll 16 and over the roll 12, over the ply guide tray 11, and the roll 13.

In passing the material underneath the dancing roller and over the guide tray and rollers, the material is deflected by the dancing roller. When the former 9 rotates it applies slight tension to the material, the dancing roller is lifted to cause the core 19 of the transducer 20 to move into the transducer coil 21 thereby operating the electric motor 23 to feed the material 6, the electrical arrangement being such that a slight increase of tension in the material 6, which causes the core 19 to move further into the transducer coil 21, operates the motor 23 to drive out the material from its roll at a greater rate. Stretching and distortion of the material is thus very considerably reduced, when compared with the previously mentioned apparatus, since any tendency to increase the tension in the material, when a greater rate of supply of material is required, causes an increased speed of rotation of the roll carrying the ply material, by virtue of the operation of the transducer and speed control unit as just described, to increase the rate of material supplied.

This advantage applies equally when the operator, having drawn the material over the guide tray in the manner described, and adhered the leading edge of the material to the building surface of the former 9, rotates the former so as to wrap the material around the entire circumference of the former. As the former rotates, the dancing roller is lifted by the slight tensioning of the material and controls the speed of supply of the material in accordance with the demand rate as described.

When the operator has wrapped a length of the material around the entire circumference of the former, the material is torn, a ply joint made and the remainder of the material is rolled back on to the roll carried by the turret which is then operated to bring the next pair of rolls into position adjacent to the former and the operation which has just been described is repeated.

Having now described our invention, what we claim is:

1. Apparatus for supplying sheet tire building material to a tire building machine which apparatus comprises a roll for carrying sheet material positioned to deliver said material through a space to said tire building machine, a variable speed electric driving motor for rotating said roll, said motor having a dynamic braking circuit and a speed control unit, a control switch to open and close said dynamic braking circuit, a transducer to control said speed control unit, a roller positioned to rest on and deflect material passing through said space from said roll to said tire building machine, a lever having an arm supporting said roller and tilting as said roller rises and falls and having an arm to engage said control switch and said transducer to speed said motor when said sheet material in said space straightens and actuates said control switch to close said braking circuit when said roller falls below a limiting distance.

2. Apparatus for supplying sheet material under slight tension to a tire building machine which apparatus comprises a roll for carrying sheet material positioned to deliver said material through a space to said tire building machine, a variable speed electric driving motor for rotating said roll, said motor having a speed control unit, a transducer to control said speed control unit, a roller positioned to rest on and deflect from a straight line material passing through said space from said roll to said tire building machine, a lever having an arm connected to said roller to tilt as said roller rises and falls and having an arm connected to said transducer to speed said motor when said sheet material in said space straightens and to slacken said motor when said sheet material in said space deflects from a straight line.

3. The apparatus of claim 2 having a take-up roll to wind up lining material interleaved with the tire building material and in which said driving motor drives said take-up roll.

4. Apparatus of claim 3 comprising a friction roller engaging the liner on said roll to drive said take-up roll and driven by said motor, said friction roller being mounted to move into and out of engagement with said lining material.

References Cited in the file of this patent

UNITED STATES PATENTS

| | | |
|---|---|---|
| 1,815,020 | Alexander et al. | July 14, 1931 |
| 1,986,224 | Goins | Jan. 1, 1935 |
| 2,480,704 | Breth | Aug. 30, 1949 |